Aug. 4, 1964   J. J. KARPIS   3,143,134
FLUID REGULATOR
Filed Dec. 12, 1960   3 Sheets-Sheet 3

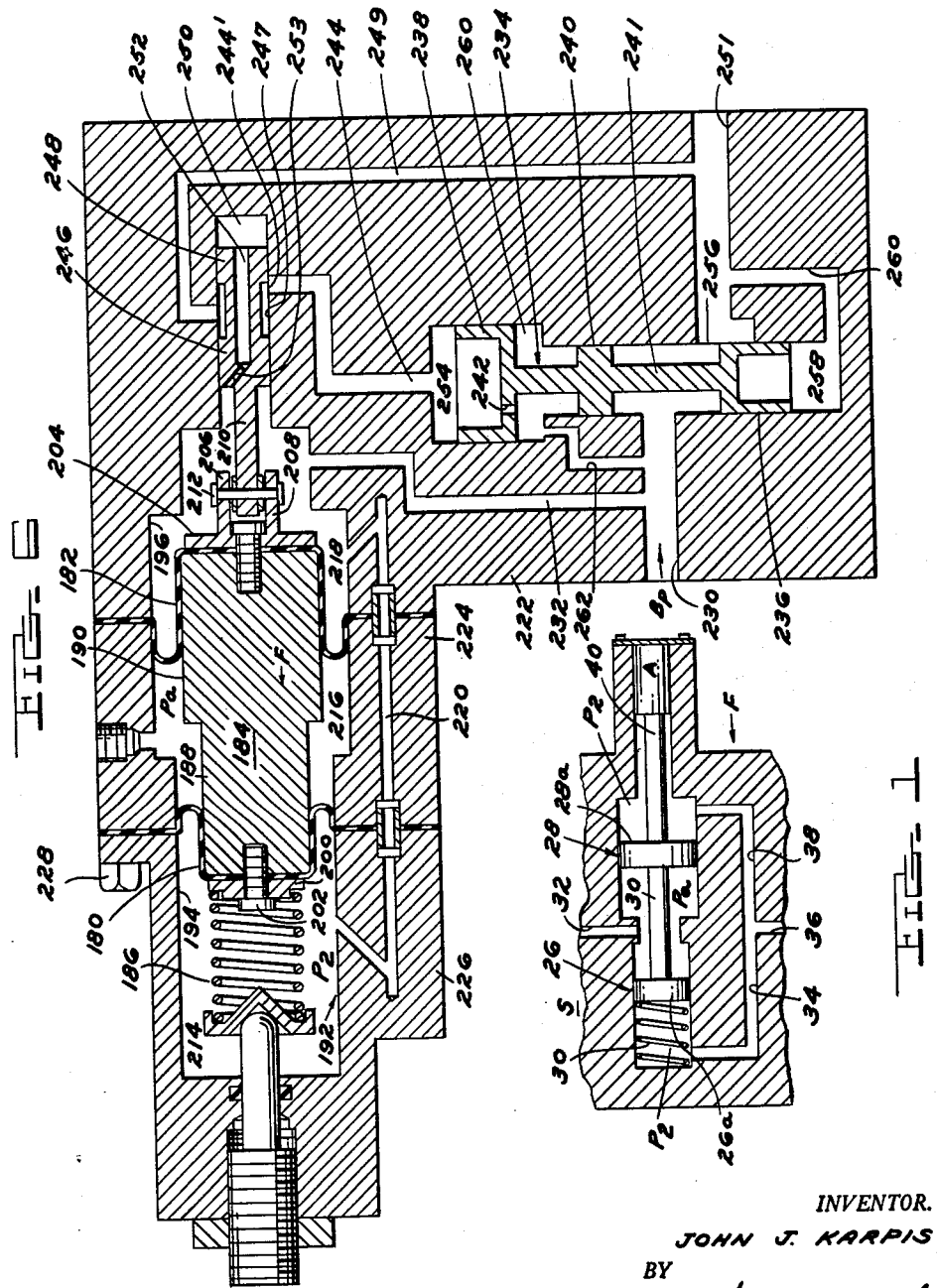

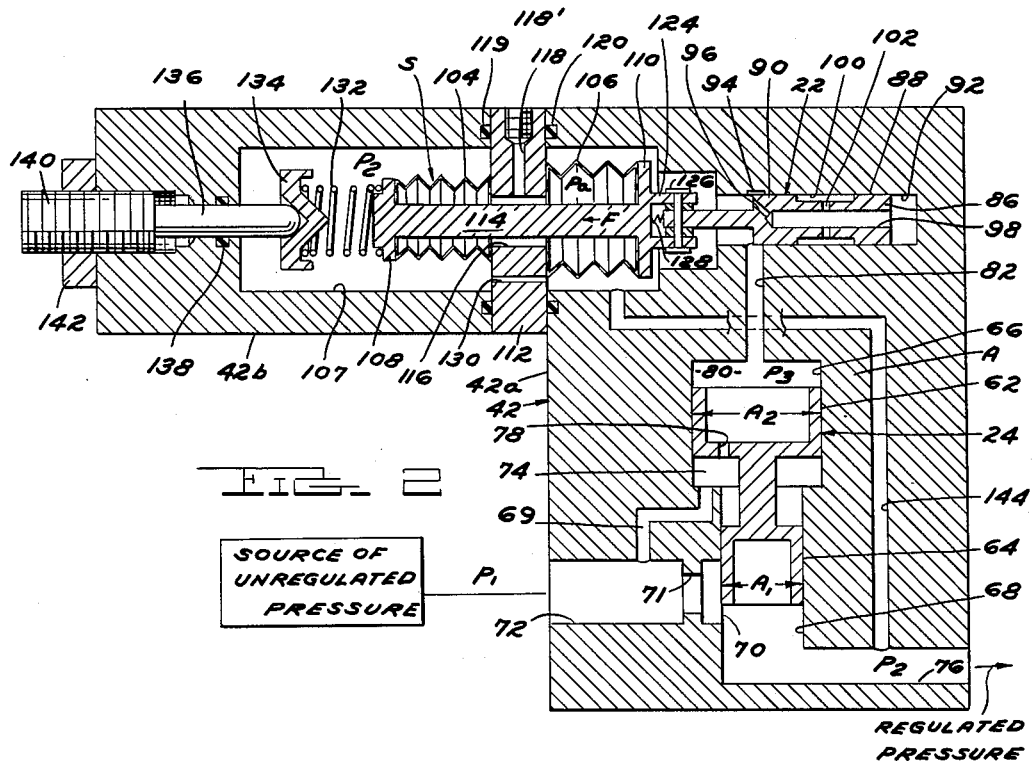
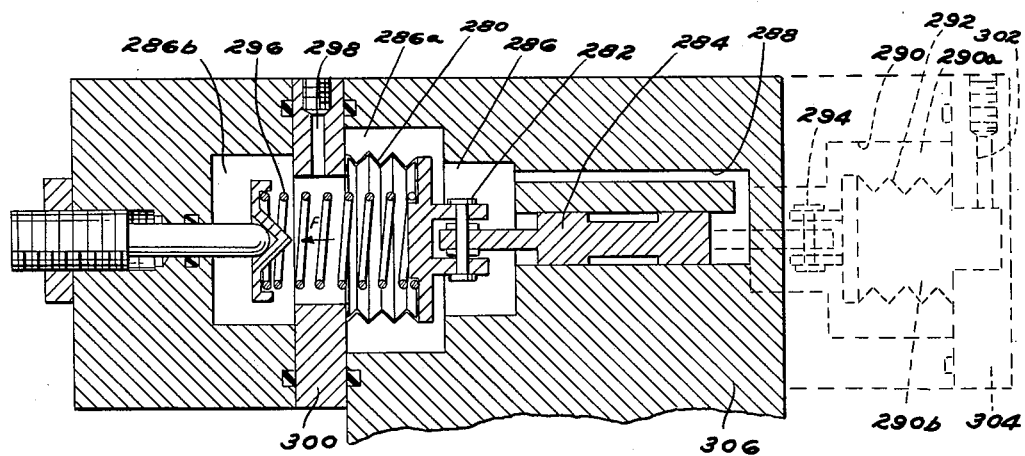

INVENTOR.
JOHN J. KARPIS
BY
Burton & Parker
ATTORNEYS

United States Patent Office 3,143,134
Patented Aug. 4, 1964

3,143,134
FLUID REGULATOR
John J. Karpis, 9901 Melrose Ave., Livonia, Mich.
Filed Dec. 12, 1960, Ser. No. 75,148
12 Claims. (Cl. 137—486)

This invention relates to fluid regulators and is applicable to fluid pressure or fluid flow regulators, responsive in their action to regulate flow or pressure as a function of or as related to a fixed or variable fluid pressure condition.

Heretofore in the design of fluid regulators it has been customary to provide a fluid regulating valve responsive to variations in fluid pressure to open or close and thus regulate fluid flow or pressure through the valve by providing a valve actuating part which is subjected to the force of the fluid pressure condition with respect to which the flow or pressure through the valve is to be regulated, and which force is opposed by a spring tensioning the part counter the force. As the fluid pressure force increases the part shifts against the spring tension thereby opening or closing the valve to effect the desired regulation. When large pressures are involved a large spring is required which from its massive size is less sensitive to a small change in fluid pressure force, with the result that the regulator is less sensitive than might be desired. When the pressure varies widely, say from 500 p.s.i. to 1000 p.s.i., the design of the spring is extremely difficult if not impossible if the regulator is at the same time to be very sensitive to small pressure changes.

In the fuel control systems for certain engines, the fuels must frequently be supplied to the engine at a rate which is a function of certain pressures in the engine or temperatures of the engine, which pressures or temperatures may vary widely and/or be of high values. In such engines optimum efficiency is attained only where the regulation of the fuel system is accurately controlled and extremely sensitive to variations in pressures and temperatures within the engine. This requires a regulator or series of regulators which are very sensitive to variations in pressures and temperatures within the engine despite relatively widely varying pressures and temperatures and which are extremely accurate in their control of fuel flow.

Disclosed herein is a regulator readily adaptable for use either as a pressure regulator, a flow regulator, a temperature regulator, a back pressure regulator, etc. and which is extremely sensitive to pressure variations despite the pressure being large or widely varying.

This extreme sensitivity at large or widely varying pressures is attainable in this regulator because the regulator design is based upon substantially complete force balancing such that even though the pressure to which the regulator is responsive may vary widely, or be of a large magnitude, a very light, sensitive, spring may be employed of an accurate and readily attainable spring rate spring design which, in turn, permits regulator operation with great sensitivity.

It is a primary object of the invention to provide a fluid regulator which, with modification, can be adapted for use as a pressure regulator, a flow regulator, a temperature regulator, etc. and which is extremely sensitive to changes in pressure, flow rate or temperature though such factors may vary widely, and which is also very sensitive to small changes though they may occur at relatively large magnitudes.

Another object of the invention is the provision of a regulator having a flow controlling throttle valve whose flow controlling position is varied by a servo valve controlled fluid pressure actuator, with a fluid pressure actuator assembly coupled with the servo valve and responsive to changes in a fluid pressure with respect to which the throttle valve is to control flow to shift the servo valve, and which actuator assembly is extremely sensitive to small changes in fluid pressure though such pressure may be quite large.

A concomitant object is the provision of a fluid pressure actuator assembly sensitive to small changes in the fluid pressure to which it is subjected though such pressure may be large, and which assembly comprises a pair of fluid pressure actuators of different effective areas connected together to oppose each other's movement with the movement of the pair being resolved in the direction of the resultant unbalanced force therebetween, and with such resultant movement and the force thereof comprising the output function of the assembly.

Another object of the invention is the provision of a fluid pressure actuator assembly for shifting a spring biased valve or the like, and which assembly is extremely sensitive to small changes in the fluid pressure to which it is subjected though such pressure be large, and which assembly is of such design that it permits the utilization of a biasing spring for the valve, which spring has a more reasonable spring rate spring design for high pressure regulation than has been possible with known forms of regulators.

Another object of this invention is the provision of a fluid regulator having a valve for controlling fluid flow through a passageway and which valve is responsive to fluid pressure in the passageway to shift toward one flow controlling position and is shifted counter such fluid pressure toward another flow controlling position by a fluid pressure actuator with the fluid pressure in such actuator being varied to effect the desired positioning of the valve. Preferably such valve is free floating and cooperates with a contoured valve port.

Other objects, advantages and meritorious features will be apparent from the following description, claims, and drawings wherein:

FIG. 1 is a cross-sectional schematic view through an assembly illustrating the force balancing principle of the invention;

FIG. 2 is a cross-sectional schematic view through a fluid pressure regulator embodying the invention;

FIG. 5 is a cross-sectional schematic view through a modified form of a regulator embodying the invention;

FIG. 6 is a cross-sectional schematic view through a back pressure regulator embodying the invention.

Figure 4:
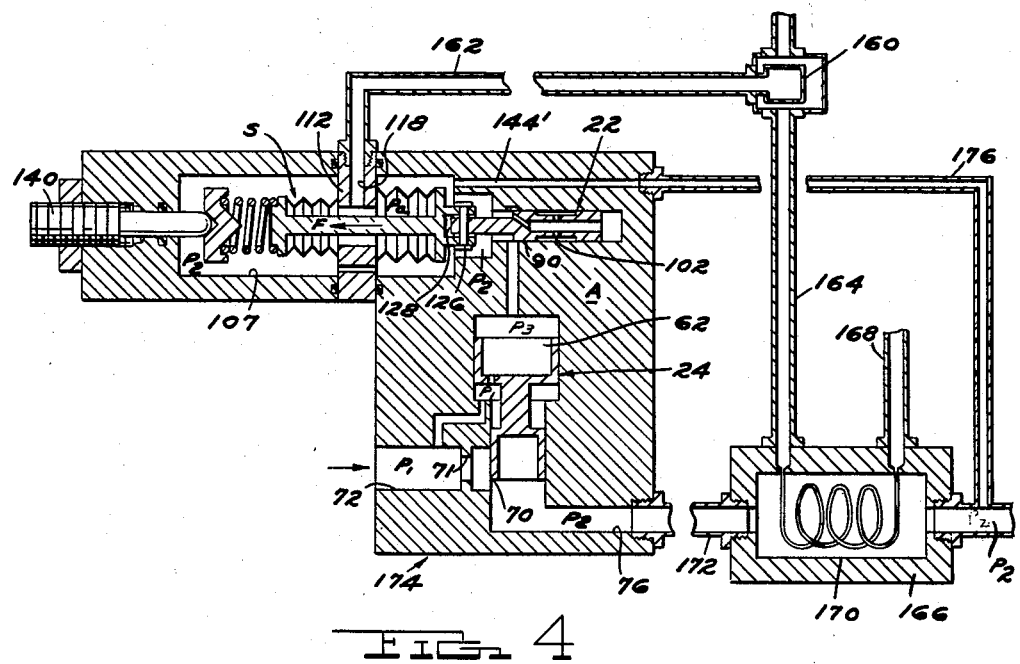
FIG. 4 is a cross-sectional schematic view through a temperature regulator and system embodying the invention.

The invention disclosed herein essentially comprises two sub-assemblies and a combination of such sub-assemblies. The sub-assemblies comprise respectively, a means sensitive to a fluid pressure condition, and a means operatively connected to the sensing means to be operated thereby to effect some desired action, such as variably restricting the flow or pressure of fluid in a passageway. A combination of these two sub-assemblies is shown in FIGS. 2–6. The sensing means is generally indicated at S and the means to be operated thereby at A. While means A is shown as comprising a servo valve 22 and a throttle valve 24, it is to be understood that sensing means S might be connected to other means for effecting a different resulting action, as for example, an electric switch for making or breaking or varying the current flow or voltage in an electric circuit.

*Sensing Means*

The sensing means S in its broadest concept is schematically shown in FIG. 1 and comprises a pair of fluid pressure responsive actuators 26 and 28 shown as pistons reciprocably sealingly received in suitably provided cylinders, with the cylinders communicating with each other between the pistons and with the pistons spaced apart by a piston rod 30 such that the actuators are in opposition to oppose each other's movement upon pressurization, with actuator 28 having a greater effective area than actuator 26 such that when the actuators are equally pressurized there is a resultant unbalanced force F moving in the direction of arrow F. Biasing means 30 operatively connected to the actuators is biased counter force F to oppose it and counter balance it over a range of shifted positions of the actuators. The fluid pressure condition establishing the reference value with respect to which the sensing means operates to effect a desired result, such as regulating a pressure or actuating an electric switch or indicator, exists as $Pa$ between the actuators, and may be atmospheric pressure admitted through passageway 32, or may be a vacuum (passageway 32 of course being closed after the vacuum is drawn), or any other desired fluid pressure condition. The fluid pressure being sensed and which is to be regulated, or in response to which the sensing means moves to attain the desired result, is admitted through passageway 36 and divides through passageways 34 and 38 to react against the actuators. Such pressure is referred to as $P2$.

Assuming that $Pa$ is atmospheric pressure or ambient pressure, then the forces acting on the assembly shown in FIG. 1 may be summarized as follows:

$$F\ \text{spring} + P2Ab1 - PaAb1 - P2Ab2 + PaAb2 = 0$$

Where:

$F$ spring = spring force of compression spring,
$P2$ = the fluid pressure exerted on faces $28a$ and $26a$ of pistons 28 and 26.
$Ab1$ = the effective area of the smaller actuator 26.
$Ab2$ = the effective area of the larger actuator 28.
$Pa$ = ambient or atmospheric pressure.

Because $Pa$ is an atmospheric pressure, and since for the purpose of this explanation the device of FIG. 1 is referenced to atmospheric pressure, the above equation can be revised to:

$$F\ \text{spring} = P2(Ab2 - Ab1)$$

It can be seen that stability is achieved by the proper relationship of the spring force and the pressure acting on the difference in area of the two actuators. Any change in either of these two variables would unbalance the equilibrium and cause the actuators to move in the same direction as that of the unbalanced force. The amount of this movement, of course, varies with the amount of the unbalanced force and with the permissible mechanical allowances of the spring.

The movement of the actuators due to an unbalanced force acting upon them may be determined from the following formula:

$$\text{Movement} = \frac{\text{unbalanced force}}{\text{spring rate of spring 30}}$$

It is apparent from the above that $Pa$ may be quite large and yet the resultant force on spring 30 may be quite small merely by making the effective areas of the two actuators nearly the same. As a result spring 30 may be designed with a reasonable spring rate spring design and can be as a consequence very sensitive. It will be apparent that this force balancing of the actuators will allow a practically unlimited sensitivity regardless of the pressure range involved merely by the proper selection of the effective areas of the two actuators and the spring rate of the spring.

As mentioned above, the device may be used to operate a valve for opening or closing a passageway containing a fluid pressure to be regulated. Such passageway may be provided with a branch passage communicating with passage 36 so that as the pressure in the passageway tends to vary the actuators will move to open or close the valve to maintain the pressure constant. In FIG. 1, A is intended to represent any device desired to be actuated by the actuators.

In the remaining figures of the drawings specific embodiments of the invention are shown which have been designed for specific applications and which incorporate features making them of commercial importance. The same force balance principle described above is incorporated in these various embodiments though such balancing is effected through somewhat different specific structures eliminating disadvantages inherent in the structure of FIG. 1. Also, such other figures disclose a servo valve and throttle valve controlled thereby illustrating a specific form of device which may be actuated by the actuator assembly.

*Pressure Regulator*

Figure 3:
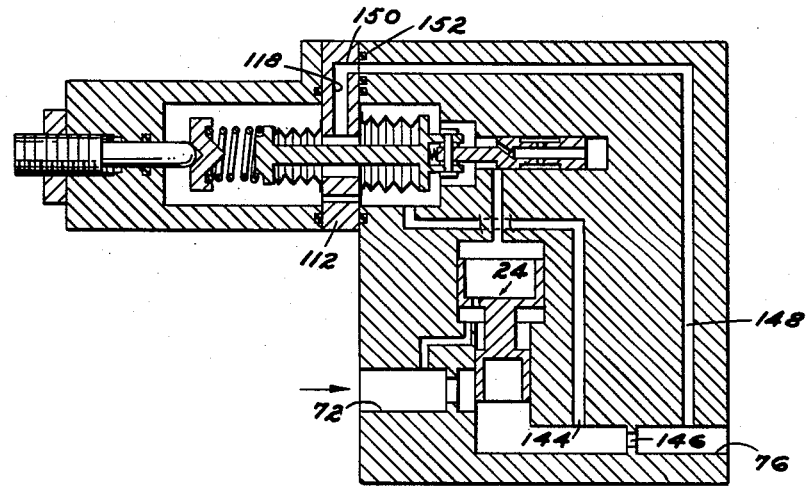
FIG. 3 is a cross-sectional schematic view through a flow regulator embodying the invention.

FIG. 2 illustrates a pressure regulator connected to a source of unregulated fluid pressure which is delivered to the regulator and is regulated thereby, and which regulator and is regulated thereby, and which regulator embodies the invention. The Sensing Means S and the means A to be operated thereby, hereinabove mentioned, are shown as being incorporated in a valve block 42. It is to be understood that the Sensing Means and the means to be actuated thereby may be individually housed with suitable connections extending therebetween. A similar valve block is shown in the embodiments of FIGS. 3, 4, and 5. The means A includes a throttle valve 24 for controlling the flow of fluid through the regulator. The position to which the throttle valve is moved whereby the control is effected is determined by the servo valve 22.

*Throttle Valve*

The throttle valve 24 comprises a piston having two unequal diameter piston lands 62 and 64 hereinafter respectively termed a "motor piston land" and a "throttle piston land." Such lands closely fit suitably provided bores 66 and 68 in the block 42. A small passageway 69 establishes fluid pressure communication between inlet passageway 72 and area 74 between the motor piston land and the throttle piston land. A "contoured" valve port 70 at the inner end of passageway 72 is opened and closed by the throttle piston land 64. The port 70 is symbolically shown as a full flow orifice with a restriction 71 upstream thereof to provide a pressure drop across the port when the port is totally uncovered by the throttle piston land. When the port is paritally covered by the throttle piston land a pressure drop would occur without restriction 71. In commercial practice port 70 would be "contoured," that is to say, it would be so shaped as to provide a pressure drop across it when it is totally uncovered by the throttle piston land. This is required to provide the necessary operating force on the throttle valve assembly. With a suitably provided contoured port, restriction 71 would be omitted. There are no mechanical seals on the piston lands and leakage is minimized by maintaining the diametrical clearance between the piston lands and the bores as small as possible and yet allow a free reciprocating action. The fluid pressure to be controlled by the throttle valve enters the regulator at a sufficient pressure and flow capacity through passage 72 and is piped to the throttle valve at the contoured valve port 70. The throttle piston land throttles the pressure source by its position in relation to the contoured valve port and thus passes the required flow to the outlet passageway 76.

An orifice 78 opens through the wall of the motor piston land 62. This orifice can alternatively be placed in a piping passageway between the valve chambers 74 and 80. This orifice allows fluid or pressure flow from the high inlet pressure source in the chamber 74 to the back end or servo end 80 of the motor piston land. It is apparent that if fluid flow, hereafter called servo flow, or pressure from this servo end of the land 62 is restricted in its escape through passageway 82, the pressure in chamber 80 will approach that of the pressure in chamber 74. The reverse is also true, that is, if the flow is unrestricted, then the pressure in chamber 80 would be much lower than the high inlet pressure in chamber 74 because the fluid would create a high pressure drop through orifice 78.

The size of orifice 78 is determined by the allowable servo flow range that is desired and by the size of the servo valve port hereinafter mentioned.

For the purpose of the following discussion the pressures existing in and around the throttle valve are as follows:

$P1$ = inlet pressure of fluid entering through passageway 72.
$P2$ = pressure leaving through passageway 76.
$P3$ = servo flow pressure in chamber 80.

Certain areas of the throttle valve are critical which are shown in FIG. 2 as follows:

$A1$ = effective area of throttle piston land 64.
$A2$ = effective area of motor piston land 62.

The forces acting on the throttle valve are as follows:

$$P2A1 - P1A1 + P1A2 - P3A2 = 0$$

or $$P2A1 + P1(A2 - A1) = P3A2$$

Since the areas $A1$ and $A2$ are constant because of their mechanical construction, it can be seen that the throttle valve is moved or is stationary depending upon the relationship of the three pressures $P1$, $P2$, and $P3$. Any change in any of these three pressures would unbalance the equalization forces acting on the piston lands and thus cause the valve piston to move in the direction of the unbalanced force until one or both of the remaining two pressures are changed to again provide an equalization force on the throttle valve such that the above equation is satisfied.

Servo Valve

Servo valve 22 is provided in the valve block 42. The servo valve comprises a servo valve piston 86 having a plurality of piston lands indicated at 88 and 90 which closely fit the bore 92. Bore 92 opens into passageway 82 through an annular undercut 94. Annular undercut 94 is provided with sharp edges. Throttling land 90 of the servo piston cooperates with the undercut 94 and its sharp edges to determine the flow area of the servo valve and acts as a restriction or a release for the "servo flow" through passageway 82.

The servo valve piston is balanced in the sense that the same fluid pressure acts on both ends of the piston and as both ends are of equal effective areas, the fluid pressure forces at opposite ends of the piston are balanced. The piston is provided with an internal passageway 96 opening through the outer end face of throttle land 90 and internally at the opposite end into communication with internal bore 98 which in turn opens outwardly through the servo land 88. The annular chamber 100 between lands 88 and 90 may be vented to the fluid pressure acting on opposite ends of the piston by the provision of cross apertures 102. If desired chamber 100 may alternatively be vented to another fluid pressure. The effective areas of the opposed faces of lands 88 and 90, which faces define opposite ends of chamber 100, are of equal effective areas such that the fluid pressure admitted to chamber 100 does not unbalance the piston.

Sensing Means

Sensing Means S, shown in FIG. 2, comprises a pair of double-acting actuators connected together to oppose each other with the effective areas being slightly unequal. More specifically, Sensing Means S comprises a pair of fluid pressure impervious bellows 104 and 106 which may be constructed of metal, rubber, fibrous material, or any other suitable material to accommodate the fluids and the pressures being handled, disposed in a bellows chamber 107 in the valve block 42. The diameters of the two bellows are slightly different. Each bellows is provided with an end plate portion 108 and 110, to which the bellows are fluid tightly sealingly connected. The bellows are sealingly fluid tightly connected at their adjacent ends to a common attachment plate 112. The end plate portions 108 and 110 are held in spaced apart relation, by a ramrod 114, and at such a distance from each other as to place some tension on the bellows. Such rod may be and preferably is integral with end plate portion 108 of the smaller bellows and disconnectedly abuts or engages the internal face of end plate portion 110. The ramrod extends through a hole 116 of the plate 112. The interior of the bellows may be vented by passageway 118 to the atmosphere.

Valve block 42 may comprise block portions 42a and 42b which are clamped against opposite sides of the common plate 112 with suitable fluid pressure seals being provided as at 119 and 120.

End plate portion 110 is connected to the servo piston 22. For this purpose the end plate may be provided with a bifurcated portion 124 within which the end of the servo piston is received and connected by a pin or the like 126. A small compression spring 128 is provided to preload or eliminate clearance between the pin and the bifurcated portion 124 and the servo piston. If desired the connection between the bellows assembly and the servo piston may include a swivel connection to allow rotation of the servo piston relative to the bellows.

Plate 112 is provided with an aperture 130 therethrough to allow for equalization of pressure in opposite ends of the bellows chamber 107 and on opposite external surfaces of the two bellows. Aperture 130 should be of sufficient size as to eliminate a pressure drop through the plate. It is apparent that with equal fluid pressure acting on the exterior of the two bellows there will be a resultant force in the direction of arrow F in FIG. 2, which force will be determined by the difference in effective areas of the two bellows. This force is opposed by a compression spring 132 which is centered at one end on the end plate portion 108 and is centered at the opposite end on a suitably provided guide plate 134, such plate being supported by an adjustable member 136. Member 136 extends through an end wall of valve block 42, being sealed by a suitable seal 138 and adjusted by a screw thread member or the like 140. A lock nut 142 may be provided for locking the screw 140 in adjusted positions.

A passageway 144 is provided opening at one end into the bellows chamber 107 and at the opposite end into the passageway 76 where the fluid pressure is to be regulated, thereby establishing fluid pressure communication therebetween.

The forces acting on the bellows may be summarized as follows:

$$F \text{ spring} + P2Ab1 - PaAb1 - P2Ab2 + PaAb2 = 0$$

Where: F spring equals the force of spring 132, $P2$ equals fluid pressure exerted on the exterior of the bellows, $Ab1$ equals effective area of the smaller bellows, $Ab2$ effective area of the larger bellows, $Pa$ equals the internal pressure (atmospheric) within the bellows.

The effective areas of the two bellows are considered constant because of their mechanical construction. It is now apparent that stability is achieved only by the proper relationship of the spring force and the pressure acting on the difference of the effective areas of the two bellows. Any change in either of these two variables would unbalance the equilibrium and cause the bellows assembly to move in the same direction as that of the unbalanced force. The amount of this movement varies with the amount of this unbalanced force and with the permissible mechanical allowances of the spring and/or the bellows assembly.

The movement of the bellows assembly as a result of an unbalanced force acting on the assembly may be determined from the following formula:

$$\text{Movement} = \frac{F \text{ unbalance}}{\text{Spring rate of spring } 132 + \text{spring rate of belows } 104 + \text{spring rate of belows } 106}$$

*Operation of Pressure Regulator*

The pressure regulator shown in FIG. 2 may be considered as functioning in general in the following manner. With the spring 132 adjusted to apply a desired force on the bellows assembly, and with the downstream pressure P2 piped to the bellows chamber by passageway 144, the servo valve will take a position with relation to the servo valve port 94 so that a pressure P3 is created in chamber 80. If this pressure P3 satisfies the equation $$P2A1 + P1(A2 - A1) = P3A2$$

then the throttle valve piston is in equilibrium and the piston is fixed in relation to the valve port 70. The position of the servo valve piston 86 with relation to servo valve port 94 is thus known as the null position of the servo valve piston. The resultant pressure P2 is then the regulated pressure as established by the spring force of spring 132 acting on the bellows assembly. The regulator can now be considered as in operation and in equilibrium.

Consider now that this equilibrium operating condition is unbalanced by an increase in the source pressure P1. With an established open area of the contoured valve port 70, the flow would increase through this port due to the rise in P1 and the downstream presure P2 would then increase. This increase would be sensed in the bellows chamber and in the throttle valve chamber 74. Two actions would then occur simultaneously. First, the bellows-servo valve equilibrium is unbalanced such that an increased pressure P2 causes the bellows to move in the direction of arrow F against the spring 132 and causing the servo valve piston land 90 to restrict or reduce the servo flow through passageway 82. The second action is that with an increase in pressure P1, more flow would occur through the orifice 78 in the motor piston land wall of the throttle valve. These two actions simultaneously aid in causing the pressure P3 to increase and thus to unbalance the equilibrium state of the throttle valve piston. This unbalance causes the throttle valve piston to move downwardly closing off a portion, or more, of the contoured valve port 70 and thus throttling the increased pressure P1 to obtain the desired pressure P2 as set by the tension of spring 132 in the bellows assembly.

As an example of the possible accuracy of a pressure regulator designed according to the above description, let the following be assumed:

Diameter of the servo valve 22 = .375 inches.
Effective area of the smaller bellows 104 = .480 square inches.
Effective area of the larger bellows = .500 square inches.
Spring rates of the small bellows and large bellows = 45 pounds per inch.
Area A2 of the motor piston land 62 = .400 square inches.
Area A1 of the throttle piston land = .200 square inches.
Spring rate of spring 132 = 10 pounds per inch.
$P1 = 600$ p.s.ig.
$P2 = 500$ p.s.i.g.
Area of orifice 78 in motor piston land 62 = .0008 square inches.

Assuming the throttle valve is stable then:

$$P3 = \frac{P2A1 + P1(A2 - A1)}{A2}$$

$$P3 = \frac{500(.200) + 600(.400 - .200)}{.400}$$

$$P3 = 550 \text{ p.s.i.}$$

The servo flow through the orifice 78 in the wall of the motor piston land would be approximately, using JP4 jet fuel, and the following formula:

$$SF = (\text{servo flow}) = KA\sqrt{\Delta P}\sqrt{SG}$$
$$SF = 11500(.0008)\sqrt{600 - 550}$$
$$SF = 64.4 \text{ pounds per hour.}$$

This servo flow would have to pass through the orifice at port 94 created by the position of the servo piston land 90 and the edge of the port 94. Assuming no leakage passed the piston land due to diametrical clearance, this would mean that the opening length between the edge of piston land 90 and the edge of port 94 would have to be approximately:

$$A = \frac{64.4}{11500\sqrt{550 - 500}}$$

$A = .0008$ square inches.
Circumference of undercut $= .375\pi = 1.18$ inches.

$$\text{Length of distance} = \frac{A}{1.18} = \frac{.0008}{1.18} = .00068 \text{ inches.}$$

The spring force applied to the bellows assembly would be:

$F$ spring $= Pa(Ab2 - Ab1)$.
$F$ spring $= 500(.500 - .480) = 10$ pounds.

The above forces would be the equilibrium condition existing or acting on the individual component at the assumed equilibrium condition of the operation of the regulator. Now assume that P2 becomes 500.25 p.s.i.g. This increased pressure would unbalance the bellows assembly's equilibrium by causing the spring 132 to be compressed to oppose the added forces acting on the bellows. The added forces are:

$F$ spring $= 500.25(.500 - .480) = 10.005$ pounds.
Difference in $F$ spring $= 10.005 - 10 = .005$ pounds.

This would mean that for the spring to exert this added force increment it would have to compress:

$$\text{Movement} = \frac{.005 \text{ pounds}}{10 + 45 + 45} = .00005 \text{ inches.}$$

This movement of the spring was caused by the dislocation of the bellows servo piston 22 by the same amount. This movement thus closed the servo valve port 94 by .00005 inches to a value of:

$$.00068 - .00005 = .00063 \text{ inch}$$

The effective area would then be:

$$A = 1.18(.00063) = .00074 \text{ square inch}$$

If it is considered that the servo flow would be the same as that at the equilibrium condition then:

$$\sqrt{P} = \frac{64.4}{11500(.00074)} = 7.5$$

$$P = 55 \text{ p.s.i.}$$

This would mean that $P3 = 500.25 + 55 = 555.25$ p.s.i.g. which is an increase of 525 p.s.i. above the previous equilibrium pressure condition acting on the motor piston land 62 of the throttle valve 24. This in turn would mean, then, an unbalanced force of:

$$PA = F$$
$$5.25 \text{ p.s.i. } (.400) = 2.1 \text{ pounds}$$

would be acting on the throttle valve piston to move the piston so that the throttle valve land 64 would close off or restrict the contoured valve port 70. This restriction would throttle off the inlet pressure P1 by reducing the effective area of the contoured valve port and thus reduce the regulated pressure P2 to its set value of 500 p.s.i. It is apparent that the unbalanced force could easily be increased by increasing the relative areas of the throttle valve piston lands to obtain a larger differential area.

The above computations show that the regulator can sense a pressure change of .05% (that is, .25 p.s.i. change in 500 p.s.i.g. and take corrective action to reposition the throttle valve to maintain the desired regulated pressure.

Another important feature of the regulator above described is that the bellows-servo valve arrangement permits the design of a regulator with practically an unlimited sensitivity regardless of the pressure range desired to be regulated, dependent only on the proper selection of the effective areas and the spring rates of the two bellows and the spring rate of spring 132. This arrangement also permits the selection of a more reasonable spring rate spring design for the higher pressure regulators. The inability to select a reasonable spring rate spring design is one of the major difficulties that confronts the designer of the prior art regulators.

Another important feature of the regulator above described is that the throttle valve is free floating without mechanical seals between its lands and the valve bores allowing a practically unlimited throttling range by merely designing the contoured valve port 70 to any desired length.

Absolute Pressure Regulator

The pressure regulator shown in FIG. 2 and above described can be readily converted to an absolute pressure regulator, that is, one which regulates a pressure referenced to a vacuum merely by evacuating and sealing the chamber within the bellows to as close to an absolute zero pressure as is capable with evacuating devices currently available. In this instance PA would approach absolute zero pressure. A metallic form of bellows would preferably be employed to minimize leakage of pressure into the evacuated area. Of course, passageway 118 would be suitably closed as by a plug or the like, threaded into the threaded bore 118′, or by a conduit connected to passageway 118 as at the threaded bore portion 118′ and extending to the means for drawing the vacuum on the evacuated area.

Preset or Auto-Pressure Regulator

The pressure regulator shown in FIG. 2 and above described can be preset for a set pressure regulation by entrapping a determined pressure in the interior of the bellows. This arrangement would eliminate the use of spring 132 as the pressure PA within the bellows would function to urge the ramrod counter arrow F. Of course after prepressuring the interior of the bellows, passage 118 would be closed as by a plug in threaded portion 118′. On the other hand for auto-pressure regulation passageway 118 can be connected to a source of controlled variable pressure to effect the regulation desired. Were the pressure PA maintained constant this would correspond to locking the threaded element 140 in a fixed position by the lock nut 142. If PA were varied as above mentioned this would correspond to an adjustment of member 140 to vary the tension of spring 132.

Flow Regulator

A flow regulator embodying the invention is shown in FIG. 3. This regulator will maintain a desired flow at the discharge side of the regulator. Flow enters in the direction of the arrow in passage 72 and leaves the regulator through passage 76. This flow regulator uses the same components as described above in connection with FIG. 2 and for this reason a structural description thereof would be repetitious and unnecessary. The flow regulator includes, however, two additional features not present in the pressure regulator, namely an orifice 146 in the passage 76 downstream of passage 144 and a passage 148 downstream of the orifice and opening at one end into passage 76 and at the other end into passage 118 which, in turn, communicates with the interior of the bellows. For the purpose of establishing communication between passages 148 and 118, the common attachment plate 112 may be laterally bored as at 150, with a seal 152 encircling the junction of passages 148 and the lateral bore 150 of passage 118 at the interface between the common plate 112 and the valve block. The orifice 146 is shown as being of a fixed area, though such may be made adjustable if desired. With this arrangement of the orifice 146 and passage 148, the bellows assembly will sense the pressure drop caused by the flow through orifice 146 and endeavor to maintain the set pressure drop across this orifice by the throttle action of the throttle valve 24. This flow regulator has the same accuracy capabilities as the pressure regulator disclosed in FIG. 2 and above described.

Temperature Regulator

In FIG. 4 is shown a temperature regulator which is essentially the same as the pressure regulator shown in FIG. 2 and above described. The interior of the bellows is vented to a thermo-responsive liquid-filled temperature bulb 160 by a conduit 162. The bulb is disposed in a line 164 through which the fluid passes whose temperature is to be regulated. The line 164 is connected to the discharge side of a heat exchanger 166. The fluid whose heat is to be extracted by the exchanger enters through the line 168 and passes through the heat transfer coil 170 and out through line 164. The coolant enters the heat exchanger through a conduit 172 from the regulator 174. The coolant enters the regulator by way of passage 72 and leaves through passage 76 as in the pressure regulator. The bellows chamber 107 is vented to the coolant at the downstream side of the heat exchanger, to eliminate servo flow through the heat exchanger, by a conduit 176 which communicates with passage 144′.

The bellows assembly is internally pressurized by the temperature sensitive fluid in the bulb 160 and the line 162. Since the bellows assembly is basically a null balance system the overall volume of the assembly will tend to be constant. Thus, any gas which follows the law $PV=NRT$ would be usable as a temperature sensing fluid. Any liquid with a suitable expansion characteristic can also be used.

Thus, it can be appreciated that the temperature regulator would act in a fashion similar to the pressure regulator of FIG. 2 but with a preloaded bellows assembly that is pressurized by the action of the temperature sensitive fluid in bulb 160. The temperature regulator would have the same accuracy as the pressure regulator of FIG. 2. Preferably a metallic bellows would be used.

A major feature of this temperature regulator is that it eliminates the necessity of using an auxiliary air pressure or other pressure source to operate a throttle valve. As shown in FIG. 4 the temperature regulator uses the pressure of the coolant entering through passage 72 and discharging through passage 76 and on through the heat exchanger, as the source of pressure for its operation.

Back Pressure Regulator

In FIG. 6 is disclosed a regulator for controlling pressure upstream rather than downstream of the control valve in contradistinction to the regulator of FIG. 2. This embodiment of the invention also differs from that of FIG. 2 in that instead of flexible wall elements in the form of bellows, a pair of fluid impervious diaphragms 180 and 182 are provided, between which the control pressure Pa exists, and externally of which the pressure to be regulated (P2) exists. If desired the diaphragms may be replaced by the bellows actuator assembly heretofore described.

As shown the diaphragms are clamped to opposite ends of a common connecting rod or piston 184 having the function, similar to ramrod 114, of transmitting force differentials to the spring 186, and in addition this connecting rod accurately determines the effective area of each diaphragm actuator. It will be noted that the rod 184 has two unequal diameter portions 188 and 190, and that the chamber 192 has two similarly unequal diameters 194 and 196, and that the diaphragms "roll" between the rod and the chamber as the rod shifts axially.

By accurately sizing the diameters of portions 190 and 196 relative to the diameters 188 and 194, the unbalance force F for any given values of pressure P2 and Pa may be easily determined according to formulas above given in connection with the FIG. 2 embodiment.

Diaphragm 180 is clamped to member 184 by a spring centering plate 200 held by a screw member 202. The spring 186 is supported in the assembly similar to spring 132. Diaphragm 182 is clamped to the opposite end of member 184 by a plate 204 having a pair of ears 206 and 208 between which the end of a servo piston 210 is pinned as at 212. The pinned connection may be suitably spring-tensioned as in FIG. 2.

The diaphragms divide the chamber 142 into three sub-chambers 214, 216 and 218, with a passageway 220 establishing fluid connection between 214 and 218. Passageway 220 is sufficiently large as to preclude a pressure drop between chambers 214 and 218 during regulator operation. The diaphragms may be clamped between portions 222, 224 and 226 of the valve block as by screw members, one of which is indicated at 228.

The back pressure enters the regulator in the direction of arrow BP by passageway 230 and communicates with chamber 192 by passageway 232. It is throttled by a throttle valve 234 having a throttling land 236, a motor piston land 238 and an idle piston land 240. As with the FIG. 2 embodiment the motor piston land has an orifice therethrough at 242, and the servo flow from the servo end of the throttle valve reaches the servo valve through a passageway 244. However, instead of communicating with the external actuator chamber, as with the FIG. 2 embodiment, passageway 244 extends to the chamber 247 between the two servo valve piston lands 246 and 248. Such servo flow is controlled at the port 244' and escapes by passageway 249 back to the regulator discharge passageway 251. The pressure BP in the actuator chamber 192 communicates with the chamber 250 at the opposite end of the servo valve by passages 252 and 253 extending internally through the servo piston.

The throttle valve has a contoured valve port 256 disposed at the downstream side of the valve rather than at the upstream side as in FIG. 2. The throttle piston is free floating as before with diameter clearance between the lands and valve bores being minimal to reduce leakage. Pressure BP communicates with the space 260 between the motor piston land 238 and the idle land 240 by passageway 262. The orifice 242 through the motor piston land is sized to allow entry of fluid pressure from passageway 262 into the chamber 254 at a rate sufficient to shift the throttle valve downwardly unless the servo valve 248 has opened sufficiently to permit the escape of the fluid pressure through passageway 249 at a rate equal to or faster than fluid is admitted to the actuator through the orifice. The size of orifice 242 in this and the other embodiments is such, in relation to the size of the orifice created at the port 244' that under the maximum pressure that may be expected in the flow passageway 230, the servo valve at its wide open position will allow pressure to escape from chamber 254 at a rate exceeding the rate at which fluid pressure can be admitted to chamber 254 through the orifice 242.

The throttle valve is, as with the preceding throttle valves, "free floating." The idle land 240 serves to mechanically guide the relatively long valve body portion 241, and may be eliminated if desired. The chamber 258 is vented to the passageway 251 by a passageway 260 to admit fluid pressure to the throttling land 236 and to vent chamber 258 so that the throttling land may shift downwardly or upwardly in chamber 258.

It will be observed from the above description of the back pressure regulator shown in FIG. 6 that the regulator will serve to maintain the back pressure developed in flow passageway 230 upstream of the throttle valve as a function of the compression to which spring 186 is adjusted, and as modified by the internal actuator pressure Pa.

*Modified Arrangement*

In FIG. 5 I have disclosed a modified form of the servo-valve-bellows arrangement wherein the bellows are disposed on either end of the servo valve piston and in essence the servo valve piston is placed in tension. One of the bellows is shown at 280 connected as by a pin 282 to the servo valve 284. The bellows is disposed in a chamber 286 communicating by a passage 288 with a corresponding chamber 290 in which the other bellows 292 is disposed. The opposite end of the servo valve is connected by a pin 294 to the bellows 292. The effective area of bellows 280 is greater than the effective area of bellows 292 whereby pressure in chambers 286 and 290 will tend to shift the bellows and servo valve in the direction of arrow F against the tension of spring 296. Each of the bellows divides its respective chamber into two sub-chambers 286a, 286b, 290a and 290b. Chambers 286b and 290b may be pressurized or evacuated as desired, as by a suitable passageway 298 through a plate 300, and a passageway 302 through an end plate 304.

Each of the bellows is sealingly connected in any suitable fashion to its respective plate and the plates are in turn sealingly secured to the valve block. Bellows 292 and its associated mechanism is shown in phantom outline indicating that the same may be disposed adjacent the valve block 306 or remote therefrom as required by the designer. The phantom outline of the bellows 292 is also for the purpose of illustrating that only one bellows may be used, namely bellows 280 with bellows 292 completely omitted. In the case of the omission of bellows 292, the pressure to be sensed by bellows 280 would be admitted thereto through passageway 288 through suitable connections. Of course, where but one bellows is used the arrangement would be less sensitive because spring 296 would have to be sized to resist the entire force of the fluid pressure acting on the other side of the bellows from the spring.

It is to be understood that as used herein the term fluid flow controlling device not only includes devices for controlling or regulating fluid flow, but also devices for controlling or regulating fluid pressure.

What is claimed is:

1. A fluid flow controlling device comprising, in combination: a fluid flow passageway through which the fluid flow to be controlled moves, a throttle valve in said passageway for controlling flow therethrough, a fluid pressure actuator coupled with the throttle valve to shift it, first passageway means establishing fluid pressure communication between said actuator and fluid pressure in said passageway at one side of the throttle valve, second passageway means communicating with the actuator for allowing the escape of fluid pressure therefrom, a fluid pressure balanced spool type servo valve in one of said passageway means for controlling the pressure in the actuator, first means for dividing a fluid pressure into opposing unequal forces of constant ratio, second means for dividing a second fluid pressure into opposing unequal forces of constant ratio, said first and second means connected together and movable in response to the resultant unbalanced force therebetween, said servo valve connected to said first and second means to move therewith, said first means subjected to the fluid pressure in said passageway at that side of the throttle valve where flow is to be regulated, said second means subjected to a fluid pressure with reference to which the said flow is to be regulated, and force opposing means connected to said first and second means and opposing and balancing the unbalanced force therebetween over a range of shifted positions of the servo valve.

2. A fluid flow controlling device comprising, in combination: a fluid flow passageway through which the fluid flow to be controlled moves, a throttle valve in said passageway for controlling flow therethrough, a fluid pressure actuator coupled with the throttle valve to shift it, fluid passageway means communicating with the actuator to introduce fluid pressure thereto and other fluid passageway means communicating with the actuator to allow fluid pressure to escape therefrom, a fluid pressure balanced spool type servo valve in one of said passageway means for controlling the pressure in the actuator, first means for dividing fluid pressure into opposing unequal forces of constant ratio, second means for dividing a second fluid pressure into opposing unequal forces of constant ratio, said first and second means connected together and movable in response to a resultant unbalanced force therebetween, said servo valve connected to said first and second means to move therewith, said first means subjected to the fluid pressure in said passageway at that side of the throttle valve where flow is to be regulated, and said second means subjected to a fluid pressure with reference to which the said flow is to be regulated.

3. The invention as defined in claim 2 characterized in that said throttle valve is free-floating and biased by the pressure of the fluid in the passageway toward one flow controlling position, and the fluid pressure actuator is operative to shift the throttle valve counter said bias toward another flow controlling position.

4. The invention as defined in claim 2 characterized in that said passageway is provided with an orifice therein through which the fluid flow to be controlled moves and said first means is subjected to fluid pressure in said passageway at one side of the orifice and said second means is subjected to fluid pressure in the passageway at the opposite side of the orifice.

5. The invention as defined in claim 2 characterized in that said throttle valve is provided with a free floating valving part movable shearingly, substantially perpendicular to the direction of flow, across the fluid flow in the passageway, said part having a facial area exposed to the fluid pressure at the downstream side of the valve reacting thereto to bias the valve toward one flow controlling position, and said actuator has a piston connected to the valving part with an effective area greater than said facial area of the valving part to shift such part counter the pressure at the downstream side of the valve in an opposite direction toward another flow controlling position.

6. The invention as defined in claim 5 characterized in that the facial area of said part reacts to the fluid pressure at the downstream side of the valve to bias the valve open.

7. The invention as defined in claim 2 characterized in that adjustable force opposing means are provided connected to said first and second means to oppose the resultant force of said first means.

8. A fluid flow controlling device as defined in claim 2 for controlling fluid flow in a heat transfer system to control heat transfer thereof, characterized in that said passageway is connected to the heat transfer system to vary temperature in the system as a function of fluid flow through the passageway, and fluid pressure generating means are provided for responding to temperature variations of the system with such generating means connected to said second means to subject the latter to a fluid pressure varying as the temperature of the system.

9. The invention as defined in claim 2 characterized in that said first means is subjected to the fluid pressure at one side of the throttle valve and said other fluid passageway means establishes communication between said actuator and the flow passageway at the other side of the throttle valve, and the servo valve is in such other fluid passageway means to control the escape of fluid pressure from the actuator.

10. The invention as defined in claim 9 characterized in that the first mentioned passageway means includes a passageway admitting fluid pressure between the piston and the valving part to react thereagainst.

11. A device for controlling fluid flow comprising: a flow passageway through which the fluid flow to be controlled moves, a spool type throttle valve in the flow passageway for controlling flow having a free floating valving part moveable shearingly, substantially perpendicular to the direction of flow, across the fluid flow in the passageway, said part having a facial area exposed to the fluid pressure at the downstream side of the valve and reacting thereto biasing the valve open, a fluid pressure actuator for the throttle valve having a piston connected to the valving part with an effective area greater than said facial area of the valving part to shift such part counter the pressure at the downstream side of the valve, passageway means establishing communication between the actuator and the flow passageway upstream of the throttle valve for admitting pressure to said effective area of the piston, and other passageway means communicating with the actuator to allow fluid pressure to escape therefrom to reduce the pressure acting upon said effective area, a fluid pressure balanced floating spool type servo valve in the last mentioned passageway means to control the escape of fluid pressure from the actuator, and fluid pressure responsive means operatively coupled to the servo valve to shift the same in response to variations in a control pressure to which the fluid pressure responsive means is subject.

12. The invention as defined in claim 11 characterized in that the fluid pressure responsive means comprises mechanism coupled to the servo valve and having opposed unequal effective areas exposed to the control pressure to provide an unbalanced resultant force and further comprises means coupled to said mechanism to oppose said unbalanced resultant force.

References Cited in the file of this patent

UNITED STATES PATENTS

| | | |
|---|---|---|
| 596,601 | Knox | Jan. 4, 1898 |
| 703,687 | Warren | July 1, 1902 |
| 859,920 | Cunning | July 16, 1907 |
| 1,631,262 | Gourdou | June 7, 1927 |
| 1,701,865 | Soderberg | Feb. 12, 1929 |
| 2,155,170 | Odend'Hal | Apr. 18, 1939 |
| 2,951,499 | Singer | Sept. 6, 1960 |
| 2,990,847 | Absalom | July 4, 1961 |
| 3,106,936 | Trautman | Oct. 15, 1963 |